United States Patent [19]

Chong

[11] Patent Number: 5,479,677

[45] Date of Patent: Jan. 2, 1996

[54] CASTER DEVICE

[76] Inventor: Ping-Feng Chong, No.22, Kuang-Fu Rd., Chi-Chin Dist., Kaohsiung City, Taiwan

[21] Appl. No.: 301,678

[22] Filed: Sep. 7, 1994

[51] Int. Cl.[6] ................................................. B60B 33/00
[52] U.S. Cl. ................................................. 16/21; 16/26
[58] Field of Search ........................... 16/20, 21, 45, 16/46, 24, 25, 26, 18 R, 29, 31 R

[56] References Cited

U.S. PATENT DOCUMENTS

| | | | |
|---|---|---|---|
| 1,392,913 | 10/1921 | Chesnutt | 16/21 |
| 1,680,446 | 8/1928 | Bowen | 16/21 |
| 1,736,110 | 11/1929 | Beemer | 16/21 |
| 1,809,609 | 6/1931 | Turner | 16/21 |
| 1,884,142 | 10/1932 | Noelting | 16/21 |
| 2,947,021 | 8/1960 | Black | 16/21 |
| 3,479,680 | 11/1969 | Clinton et al. | 16/21 |
| 4,707,880 | 11/1987 | Doyle et al. | 16/21 |

*Primary Examiner*—P. Austin Bradley
*Assistant Examiner*—Chuck Y. Mah
*Attorney, Agent, or Firm*—Birch, Stewart, Kolasch & Birch

[57] ABSTRACT

A caster device for supporting a push cart includes a cap member having a flat top fixed to the push cart and a circular side wall. The circular side wall of the cap member has an inwardly curled lower edge. An inverted and truncated conical ring member has a curved side wall and a flange. A bowl-shaped rotary member is disposed below the ring member such that a horizontal flange thereof abuts the flange of the ring member. The side wall of the rotary member and the curved side wall of the ring member cooperatively define a first annular ball-receiving space. The horizontal flange and the side wall of the rotary member, and the inwardly curled lower edge of the cap member cooperatively define a second annular ball-receiving space. A plurality of steel balls are rotatably confined within the first annular ball-receiving space and the second annular ball-receiving space to permit rotation of the rotary member with respect to the cap member.

7 Claims, 8 Drawing Sheets

CASTER DEVICE

BACKGROUND OF THE INVENTION

1. Field of the Invention

This invention relates to a caster device, more particularly to an improved caster device which is used for supporting a push cart.

2. Description of the Related Art

Referring to FIG. 1, a conventional caster device 1 is shown to be adapted to support a push cart 10 for carrying books, foods or other heavy things thereon. The conventional caster device includes a mounting member 11 which is fixed to the bottom of the push cart 10. A bolt 12 is welded to the mounting member 11. A rotary member 13 and a retaining member 14 are secured to the mounting member 11 by means of the bolt 12. The bottom face of the mounting member 11 has a first annular ball-receiving groove 111, while a second annular ball-receiving groove 131 is formed correspondingly in the top face of a rotary member 13. The bottom face of the rotary member 13 has a third annular ball-receiving groove 132, while a fourth annular ball-receiving groove 141 is formed correspondingly in the top face of the retaining member 14. A plurality of steel balls 18 are confined rotatably between the first and the second ball-receiving grooves 111, 131, and between the third and the fourth ball-receiving grooves 132, 141. A nut 15 engages the bolt 12, and a pin 16 passes perpendicularly through the nut 15 and the bolt 12 in order to secure firmly the rotary member 13 and the retaining member 12 in position. The rotary member 13 has a pair of support legs 133 depending therefrom. A wheel 19 is disposed pivotally between support legs 133 by means of a rivet 134. As a result, the rotary member 13 can rotate relative to the mounting member 11 due to rotation of the steel balls 18, thereby enabling the user to readily move the push cart 10 in any direction.

It is noted that it is difficult to place heavy things uniformly on the push cart 10. Thus, the push cart 10 will have an unbalanced depression force which is exerted on the rotary member 13. The caster device 1 may have the following problems:

1. Since the diameter of the retaining member 14 is limited by the distance between the support legs 133, the retaining member 14 merely supports a part of the mounting member 11 and the rotary member 13. Thus, the effective supporting area of the retaining member 14 is relatively small. The rotary member 13 will generate a force that bears against the unbalanced depressed movement of the push cart 10. Cooperatively, the design of the first ball-bearing groove 111 and the second ball-bearing groove 131 does not enclose the steel balls 18 and forms a clearance therebetween. Hence, the mounting member 11 will incline to a direction that causes the mounting member 11 to move away from the rotary member 13, thereby forming a larger clearance that easily causes the release of the steel balls 18. Furthermore, sand, mud, and rocks will enter the first and second ball-bearing grooves 111, 131 through the larger clearance, thus resulting in friction between the steel balls 18, the mounting member 11, and the rotary member 13 and in eventual damage to the steel ball 18. Therefore, the user has to change the steel balls 18 very often.

2. Because only the rotary member 13 can bear against the unbalanced force exerted from the caster device 1, the support legs 133 will gradually bend or even break down to reduce the caster device's life time. Besides, when the push cart 10 is in use, damage to the support legs 133 may cause an unstable movement to result in accidents and in things falling from the push cart 10.

3. With reference to FIG. 1, the caster device 1 is not an enclosed design. When the push cart 10 is in use, the wheel 19 may pass through a body of water. Water is easily retained in the annular ball-bearing grooves 131, 141 and prevents the steel balls 18 from being smoothly moved for changing the direction of the push cart 10.

4. The bolt 12 is welded to the mounting member 11 in such a manner that the rotary member 13 and the retaining member 14 are fixed to the mounting member 11 merely by means of the bolt 12. As a result, the unbalanced depression force exerted from the push cart 10 will cause the bolt 12 to split or break.

SUMMARY OF THE INVENTION

Therefore, the main object of this invention is to provide an improved caster device which includes a cap member for receiving a ring member and a rotary member in such a manner that a plurality of steel balls are prevented from sliding from the caster device when a push cart carries heavy things and exerts an unbalanced depression force on the cap member. Thus, sand, mud, and rocks are not easily retained in the caster device, and the steel balls are protected from damage.

The second object of this invention is to provide an improved caster device which has a stronger structure for supporting two support legs so that the support legs will not incline after a period of time to avoid accidents and to enable the caster device to have a longer life time.

The third object of this invention is to provide an improved caster device which has a cap member, and a ring member and a rotary member that cooperate to confine a plurality of steel balls in such a manner that the steel balls are enveloped therein. Water cannot enter into the caster device so as to ensure that the steel balls can be rotated smoothly.

The fourth object of this invention is to provide an improved caster device in which a bolt thereof is prevented from being split or broken when an unbalanced depression force is exerted from the push cart.

According to this invention, the caster device for supporting a push cart is shown to include a cap member having a flat top fixed to the push cart and a circular side wall depending downwardly from the flat top. The flat top has two pins which are fixed to a bottom face of the flat top. The circular side wall of the cap member has an inwardly curled lower edge. An inverted and truncated conical ring member has a curved side wall and a flange which extends horizontally and outwardly from an upper edge of the curved side wall. The flange has two notches respectively engaging the pins of the cap member so as to position the ring member within the cap member such that the flange of the ring member abuts the bottom face of the flat top of the cap member. A bowl-shaped rotary member has a bottom and a side wall extending upwardly from the bottom. The side wall has a top edge and a horizontal flange extending outwardly from the top edge of the side wall. The bottom of the rotary member has at least two equally spaced threaded holes formed therein. The rotary member is disposed below the ring member such that the horizontal flange abuts the flange of the ring member and such that the side wall of the rotary member is supported by the inwardly curled lower edge of the cap member. The side wall of the rotary member and the curved side wall of the ring member cooperatively define a first annular ball-receiving space. The horizontal flange and the side wall of the rotary member, and the inwardly curled lower edge of the cap member cooperatively define a second annular ball-receiving space. A plurality of steel balls are confined rotatably and respectively within the first annular ball-receiving space and the second annular ball-receiving space to permit rotation of the rotary member with respect to the cap member. An inverted U-shaped bracket has a base and two support legs suspended downwardly from the base. At least two fastening bolts pass through the base of the inverted U-shaped bracket to engage the threaded holes in the circular bottom wall of the rotary member so that the inverted U-shaped bracket can rotate with the rotary member. A wheel is mounted rotatably between the support legs of the inverted U-shaped bracket.

BRIEF DESCRIPTION OF THE DRAWINGS

Other features and advantages of this invention will become apparent in the following detailed description of the preferred embodiments of this invention with reference to the accompanying drawings, in which.

DETAILED DESCRIPTION OF THE PREFERRED EMBODIMENTS

The embodiments of the present invention will now be described with reference to the accompanying drawings.

Accordingly, a caster device of the preferred embodiment of the present invention is adapted to be secured to the bottom of a push cart 20.

Figure 1:
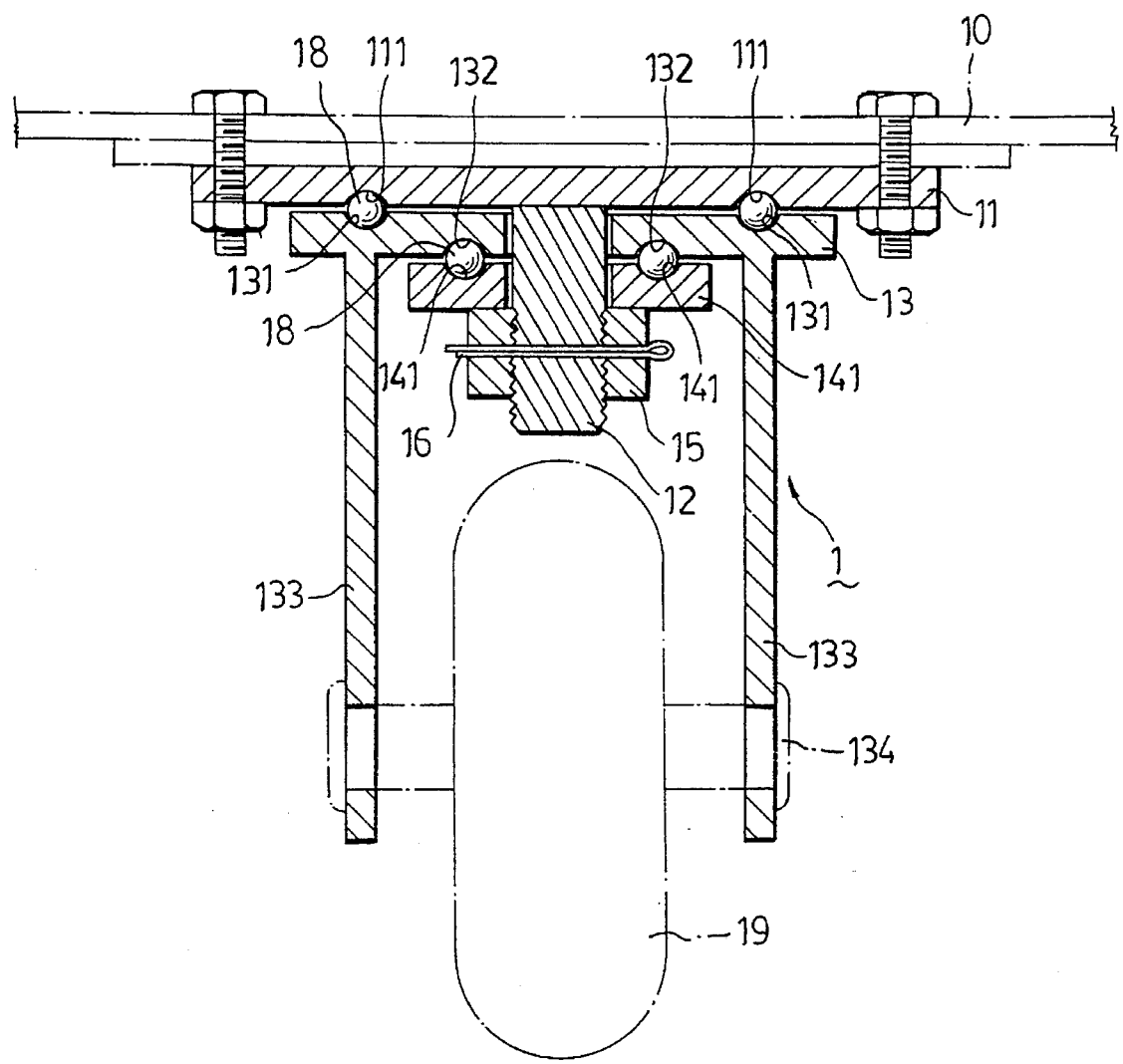
FIG. 1 is a sectional view of a conventional caster device.
Figure 2:
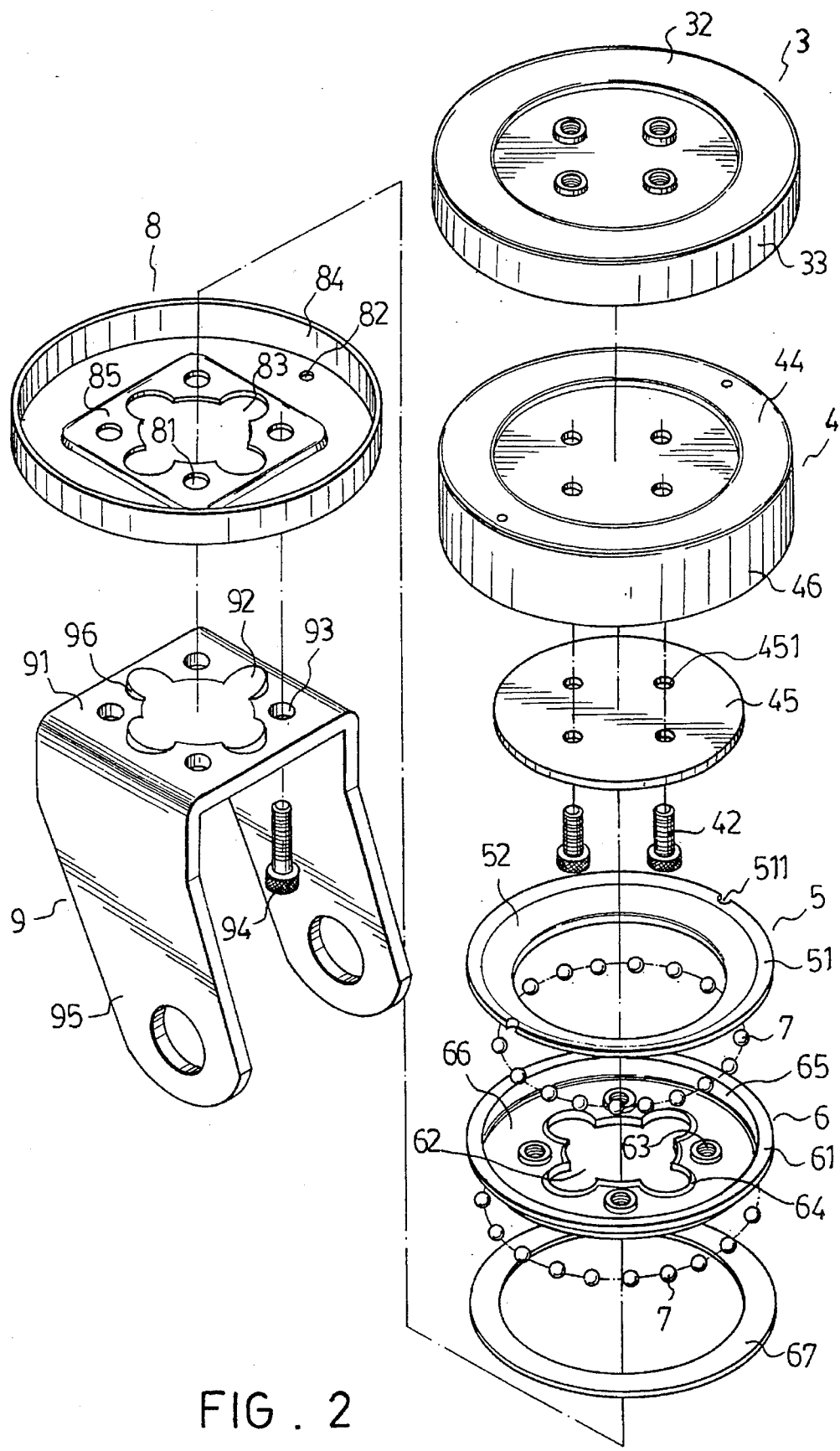
FIG. 2 is an exploded perspective view showing a caster device according to a first embodiment of the present invention.
Figure 3:
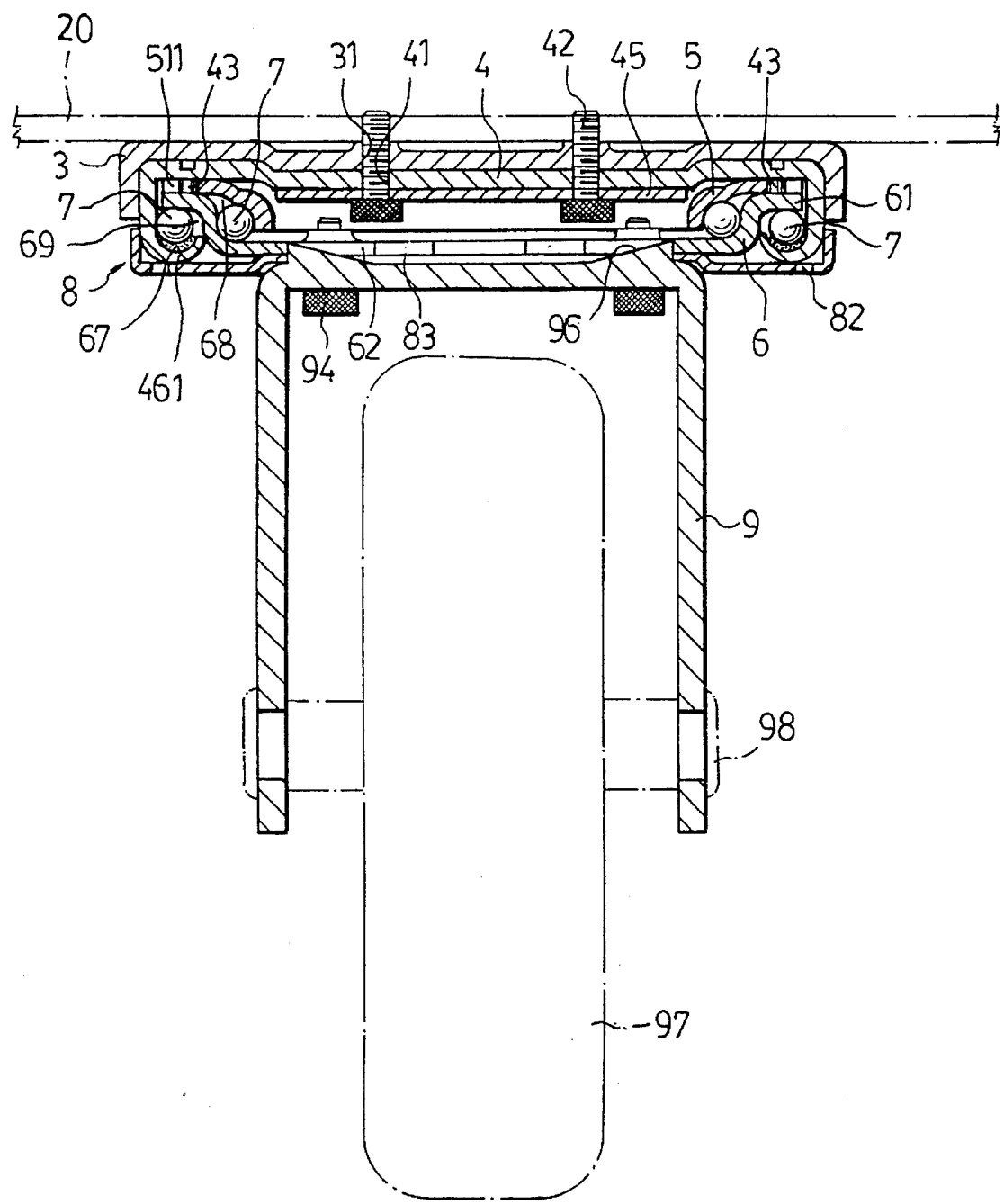
FIG. 3 is a sectional view illustrating the caster device according to the first embodiment of the present invention.

Referring to FIGS. 2 and 3, a caster device in accordance with the first embodiment of the present invention is shown to include a mounting member 3 and a cap member 4. The mounting member 3 has a circular wall 33 suspended from the top face 32 thereof. The top face 32 of the mounting member 3 has four threaded holes 31 arranged radially therein. The cap member 4 has a circular side wall 46 depending from the flat top 44 and four through holes 41 corresponding to the threaded holes 31. The circular side wall 46 is journalled to the circular wall 33, and the flat top 44 abuts the top face 32 so that four bolts 42 can pass respectively through four holes 451 of a connecting piece 45, the through holes 41 of the cap member 4, and the threaded holes 31 of the mounting member 3 in order to fix the cap member 4 and the mounting member 3 to the bottom of the push cart 20. The connecting piece 45 can reduce friction between the bolts 42 and the cap member 4. The upper part of the side wall 46 of the cap member 4 is received within the mounting member 3.

The flat top 44 of the cap member 4 has two pins 43 which are punched downwardly therefrom and which are positioned opposite to each other. An inverted and truncated conical ring member 5 is formed by a curved side wall 52 and a flange 51 connected to the upper edge of the curved side wall 52. The flange 51 has two notches 511 formed therein for engaging respectively the pins 43 of the flat top 44 when the flange 51 is attached to the flat top 44. The ring member 5 is retained in the cap member 4.

The caster device further includes a bowl-shaped rotary member 6 mounted to the inside of the cap member 4. The rotary member 6 has a side wall 65 which extends upwardly from the bottom 66 of the rotary member 6. A horizontal flange 61 of the rotary member 6 extends outwardly from the top edge of the side wall 65. The bottom 66 of the bowl-shaped rotary member 6 has an opening 62 formed therein. The opening 62 is generally cross-shaped and has an upwardly projecting lip 64 which extends along the periphery of the opening 62. The bottom 66 has four equally spaced threaded holes 63 formed therein. The rotary member 6 is positioned below the ring member 5 such that the horizontal flange 61 contacts the flange 51 of the ring member 5. A first annular ball-receiving space 68 is formed between the side wall 65 of the rotary member 6 and the curved side wall 52 of the ring member 5. The cap member 4 has a curled lower edge 461 which supports the side wall 65 of the rotary member 6 in such a manner that a second annular ball-receiving space 69 is formed cooperatively between the curled lower edge 461 and the side wall 65 of the rotary member 6. A plurality of steel balls 7 are confined respectively and rotatably in the first and second annular ball-receiving spaces 68, 69, thus permitting rotation the rotary member 6 relative to the cap member 4. The steel balls 7 in the second annular ball-receiving space 69 interconnect the horizontal flange 61 of the rotary member 6, the sliding ring 67 and the curled lower edge 461 of the cap member 4. A sliding ring 67 is mounted in the second annular ball-receiving space 69 between the steel balls 7 and the curled lower edge 461 of the cap member 4 to facilitate smooth rotation of the steel balls 7 in the second annular ball-receiving space 69.

The assembly of the rotary member 6 and the ring member 5 to the cap member 4 is as follows. After the mounting member 3 and the cap member 4 have been orderly mounted to the bottom of the push cart 20, and the ring member 5 has been mounted securely in the cap member 4, the steel balls 7 are placed on the flange 51 of the ring member 5 adjacent to the curved side wall 52. Lubricant fills the cap member 4 between the curved side wall 52 of the ring member 5 and the circular side wall 46 of the cap member 4. The rotary member 6 is mounted to the ring member 5 in the cap member 4 so that the steel balls 7 are positioned between the curved side wall 52 of the ring member 5 and the side wall 65 of the rotary member 6. Subsequently, additional steel balls 7 are placed on the horizontal flange 61 of the rotary member 6 adjacent to the side wall 65 of the rotary member 6 and the circular side wall 46 of the cap member 4. Lubricant fills the cap member 4 between the flange 61 and the side wall 65 of the rotary member 6 and the circular side wall 46 of the cap member 4. The sliding ring 67 is positioned on the additional steel balls 7 in the cap member 4 such that the periphery of the sliding ring 67 is positioned between the circular side wall 46 of cap member 4 and the side wall 65 of the rotary member 6. Then, the lower part of the circular side wall 46 of the cap member 4 is punched by a die to form the curled lower edge 461. The curled lower edge 461 supports the side wall 65 of the rotary member 6 so as to prevent the bowl-shaped rotary member 6 from sliding out of the cap member 4. Thus, the rotary member 6 can be rotated with respect to the cap member 4.

The steel balls 7 in the first and second ball-receiving space 68, 69 can rotate smoothly due to the presence of the lubricant. The bottom 66 of the rotary member 6 will retain the lubricant in the first ball-receiving space 68. In addition, the projecting lip 64 can prevent the lubricant for the steel balls 7 from flowing over the bowl-shaped rotary member 6. It can be noted that the steel balls 7 are enclosed in the caster device of this invention. Therefore, sand, mud and rocks cannot easily enter into the caster device.

A cover member 8 is positioned below the rotary member 6. The cover member 8 has an upwardly extending circular wall 84 connected to the bottom wall thereof. Four through holes 81 are spaced equally in a projection 85 which is punched upwardly by a die in the bottom wall of the cover member 8. The projection 85 has a cross-shaped opening 83 corresponding to the opening 62 of the rotary member 6. The upwardly extending circular wall 84 of the cover member 8 is sleeved to the lower part of the circular side wall 46 of the cap member 4 in order to prevent sand, mud, and rocks from damaging the caster device. The bottom wall of the cover member 8 has two diametrically opposed bores 82 formed therein for releasing water in the cover member 8.

An inverted U-shaped bracket 9 consists of a base 91 and two support legs 95 which depend from the base 91. The base 91 has a cross-shaped opening 92 and four threaded holes 93. A protrusion portion of the base 91 includes two pairs of diametrically opposed lugs 96 fitted securely in the cross-shaped opening 92. Each pair of the lugs 96 pass through the opening 81 of the cover member 8 to engage firmly the projecting lip 64 of the rotary member 6. The bracket 9 has four fastening bolts 94 passing through the threaded holes 93 and the through holes 81 to engage the threaded holes 63. Therefore, the cover member 8 can be fixed firmly between the rotary member 6 and the cover member 8. When the rotary member 6 is actuated, the cover member 8 will cooperatively rotate therewith. Each of the support legs 95 has a wheel 97 retained securely in place by a bolt 98. As a result, when the caster device is in use, the rotary member 6 can allow the wheel 97 to move in any direction. The support area of the caster device is bigger because the curled lower edge 461 of the cap member 4 bears against the side wall 65 of the rotary member 6. Thus, the caster device has a firmer structure so that the support legs 95 will not bend easily after prolonged use and so that the caster device will have a longer life time. Moreover, the upwardly extending circular wall 84 of the cover member 8 can protect the caster device from sand, mud and rocks.

Figure 4:
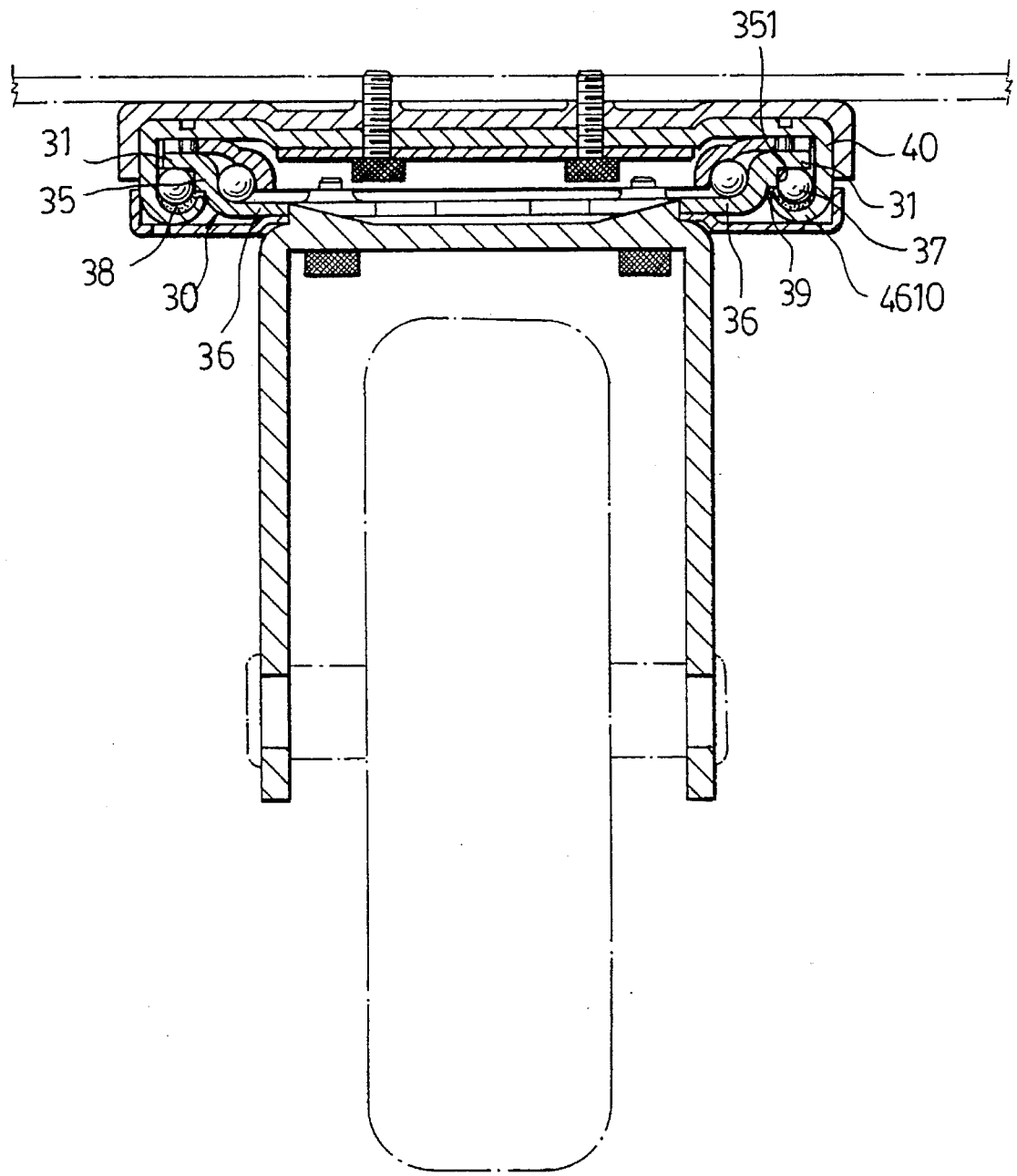
FIG. 4 is a sectional view showing a caster device according to a second embodiment of the present invention.

Referring to FIG. 4, a caster device according to a second embodiment of the present invention is shown. The structure of the caster device is the same as that of the caster device of the first embodiment except for the rotary member 30. The rotary member 30 has a bottom 36, a side wall 35 with a stepped portion 351, and a horizontal flange 31 connected firmly to the top edge of the side wall 35. The stepped portion 351 of the side wall 35 and a curled lower edge 4610 of a cap member 40 define an annular ball-receiving space 39. A sliding ring 38 is mounted in the annular ball-receiving space 39 so that a plurality of steel balls 37 can be confined within the ball-receiving space 39 and can bear against the horizontal flange 31 in order to secure the rotary member 30 in the cap member 40. Furthermore, the stepped portion 351 of the side wall 35 can limit the space for the rotation of the steel balls 37. The curled lower edge 4610 of the cap member 40 supports and seals the side wall 35 so that lubricant cannot leak through the ball-receiving space 39.

Figure 5:
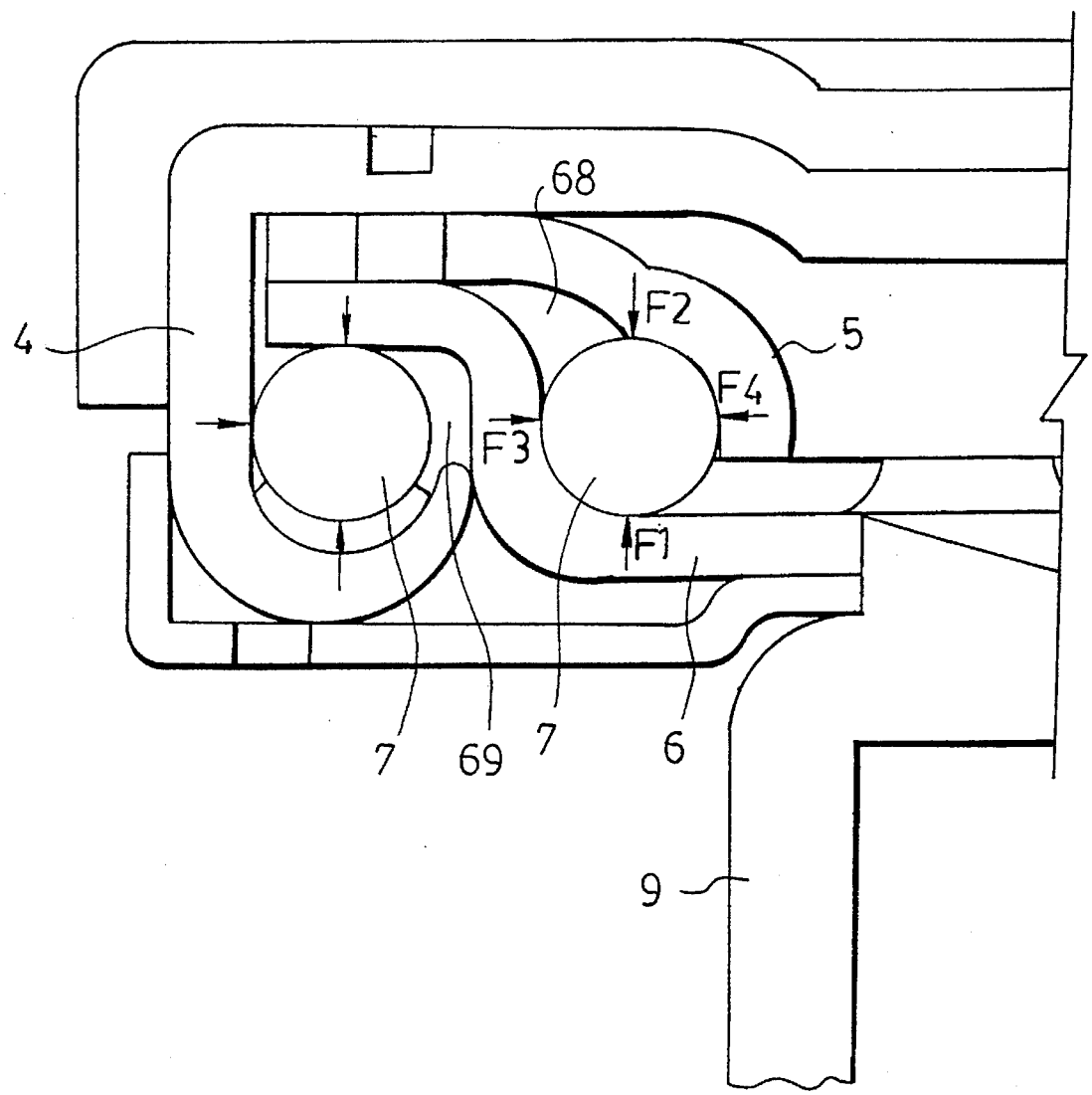
FIG. 5 is a partially sectional view of the caster device according to the first embodiment of the present invention.

The rotary member 30 of the second embodiment is shaped similarly as the bowl-shaped rotary member 6 of the first embodiment except for the stepped portion 351 of the side wall 35 of the rotary member 30. The rotary members 6, 30 of the first and second preferred embodiments can be mounted in the cap member 4, 40 and can confine the steel balls 7, 37 in the annular ball-receiving spaces 69, 39. In addition, as best shown in FIG. 5, when an unbalancing force is exerted on one of the support legs 9 of the caster device, an upward reaction force (F1) will be exerted on the steel balls 7 in the first annular ball-receiving space 68 through the rotary member 6. The ring member 5 also produces a reaction force (F2) against the reaction force (F1) exerted on the steel balls 7 in the first ball-receiving space 68. Similarly, a left side horizontal reaction force (F3) and a right side horizontal reaction force (F4) cancel out because the steel balls 7 are all enclosed securely in the first and second annular ball-receiving spaces 68, 69. Thus, these forces (F1, F2, F3, F4) can be balanced and can immobilize the steel balls 7. Furthermore, the larger the contact areas between the steel balls 7 and the members 4, 5, 6 are, the better will be the balance of the caster device.

Referring again to FIG. 3, because the steel balls 7 are positioned stably in the first and second ball-receiving spaces 68, 69, an upward balancing reaction to the caster device is generated when the push cart 20 carries things thereon. The supporting legs 9 will not incline, and the weight of the things carried can be distributed uniformly on the parts of the caster device of this invention.

Figure 6:
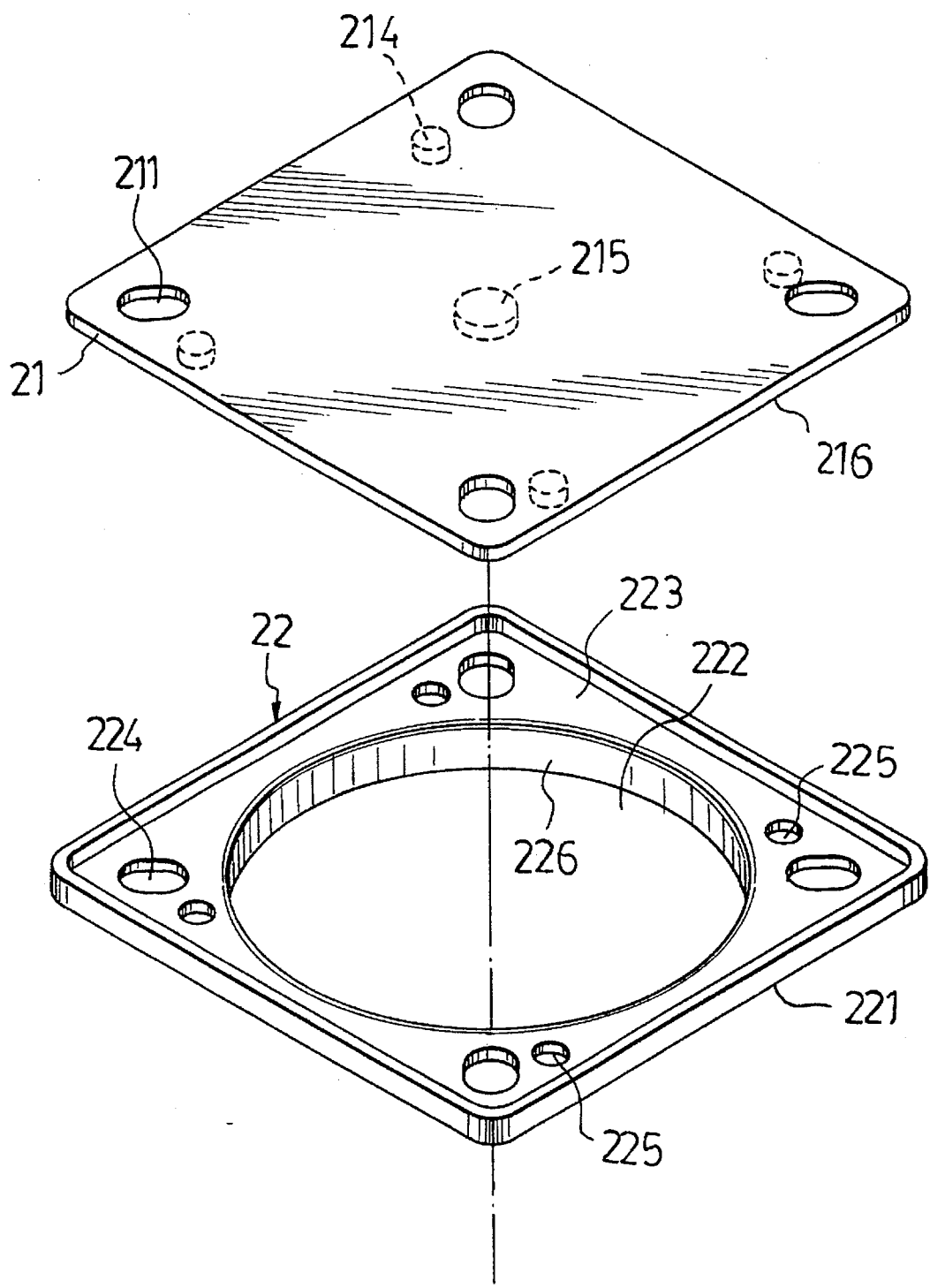
FIG. 6 is a perspective view of a plate member and a inverted hat member of a caster device according to a third embodiment of the present invention.
Figure 7:
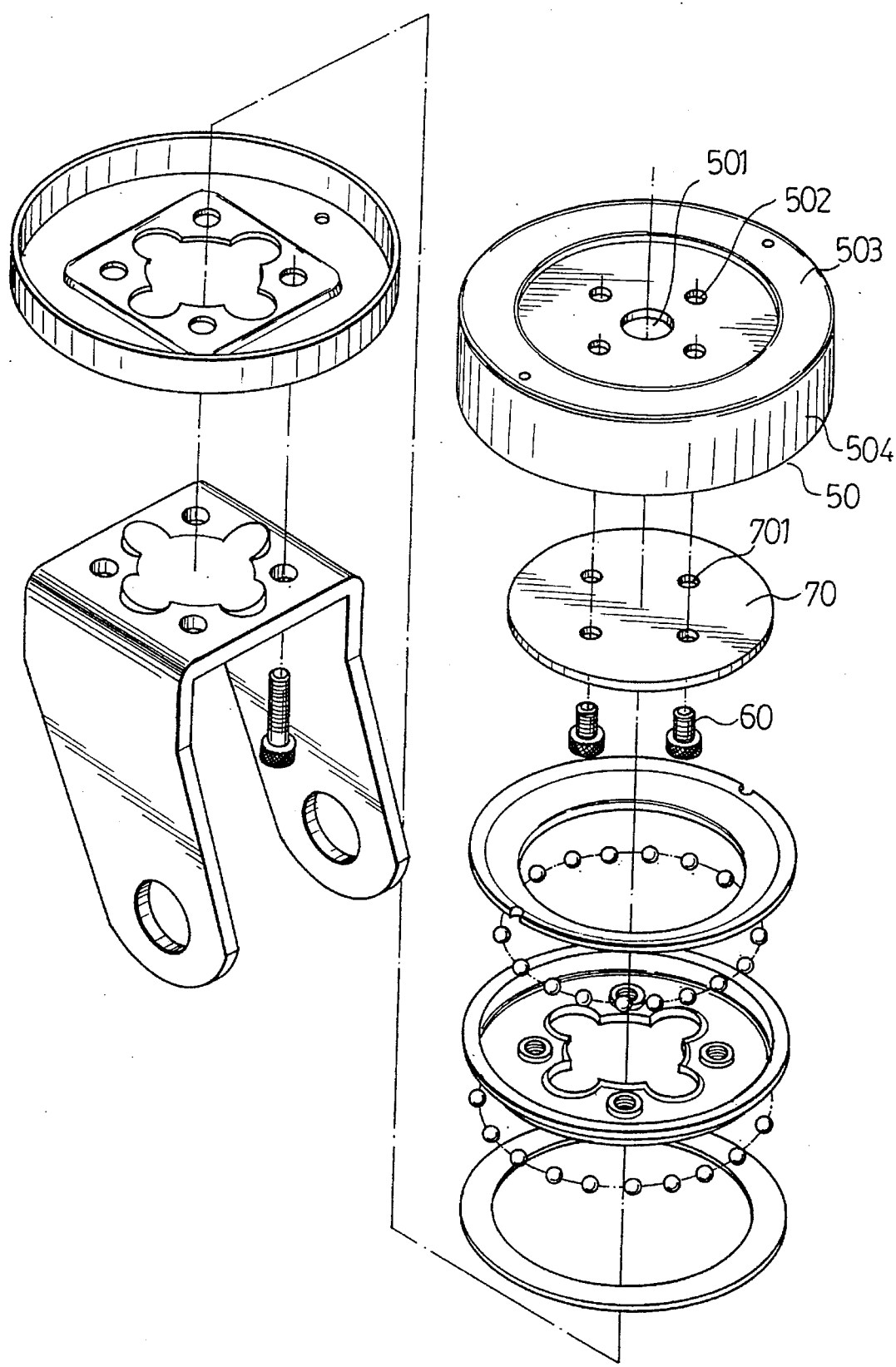
FIG. 7 is an exploded view illustrating the caster device according to the third embodiment of the present invention.
Figure 8:
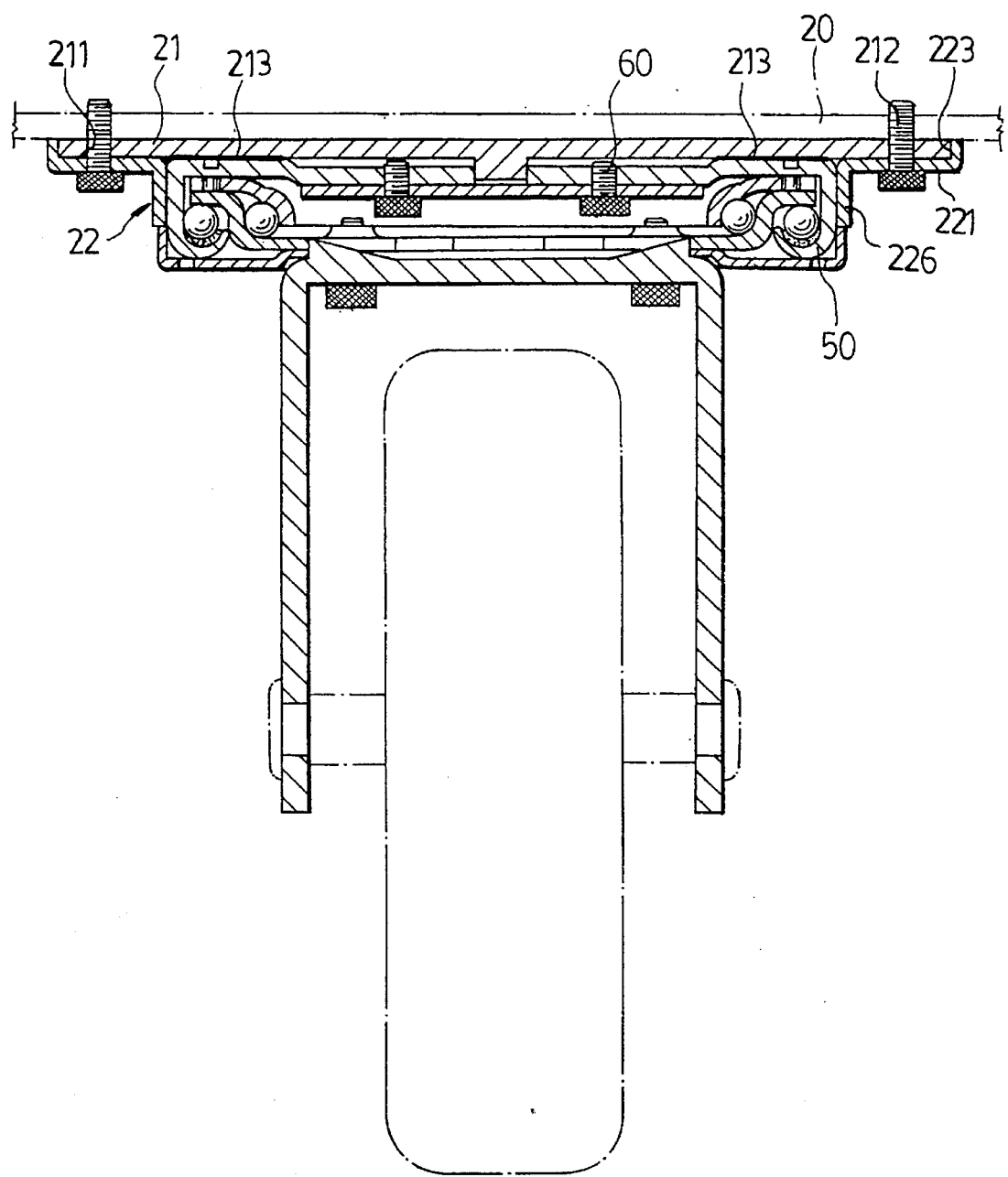
FIG. 8 is a sectional view of the caster device according to the third embodiment of the present invention.

Referring to FIGS. 6 and 8, a caster device according to a third embodiment of the present invention is shown. The structure of the caster device of the third embodiment is the same as that of the caster devices of the first embodiment except that there is the mounting member 3. The caster device of the third embodiment has a plate member 21 and an inverted hat member 22 affixed to the bottom of the push cart 20. The plate member 21 has four through holes 211 spaced equidistantly from each other, four spaced pins 214 connected firmly to the bottom face 216 of the plate member 21 adjacent to the through holes 211, and a central pin 215 mounted securely on the bottom face 216 of the plate member 21. The pins 214 can extend respectively through four holes 224 of an inverted hat member 22 for retaining the plate member 21. The plate member 21 is received within a recess 223 which is formed in the top face of the inverted hat member 22. As best illustrated in FIG. 6, the plate member 21 is attached to the bottom of the push cart 20. The inverted hat member 22 is positioned below the plate member 21 after the pins 214 of the plate member 21 engage respectively the holes 224 of the inverted hat member 22 so that four threading bolts 212 can pass through the inverted hat member 22 and the plate member 21 to engage the bottom of the push cart 20. As a result, the plate member 21 and the inverted hat member 22 are connected to the bottom of the push cart 20. Furthermore, the inverted hat member 22 has an opening 222 formed in the bottom face 221 thereof and communicated with the recess 223. A cap member 50 has a flat top 503 and a central opening 501, as best show in FIG. 7. The flat top 503 passes through the opening 222 of the inverted hat member 22 and has a connecting portion 213 which is welded to the bottom face 216 of the plate member 21. The pin 215 of the plate member 21 is inserted into the central opening 501, thereby fixing the cap member 50 to the plate member 21. Four bolts 60 pass respectively through four holes 701 of a connecting piece 70 to engage four through holes 502 of the cap member 50. The inverted hat member 22 has an annular wall 226 depending downwardly from the opening 222 to cover the connecting portion 213 of the cap member 50, thus enhancing the appearance of the caster device. The annular wall 226 surrounds the upper part of the circular side wall 504 of the cap member 50. The cap member 50 is received in the inverted hat member 21. Thus, the inverted hat member 22 can protect the caster device away from sand, rocks, and mud so as to enhance the smooth rotation of the steel balls.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A caster device for supporting a push cart, comprising:

a cap member having a flat top adapted to be fixed to the push cart and a circular side wall depending downwardly from said flat top, said flat top having two pins fixed to a bottom face of said flat top, said circular side wall of said cap member having an inwardly curled lower edge;

an inverted and truncated conical ring member having a curved side wall and a flange extending horizontally and outwardly from an upper edge of said curved side wall, said flange having two notches respectively engaging said pins of said cap member so as to position said ring member within said cap member such that said flange of said ring member abuts said bottom face of said flat top of said cap member;

a bowl-shaped rotary member having a circular bottom wall and a side wall extending upwardly from said bottom, said side wall having a top edge and a horizontal flange extending outwardly from said top edge of said side wall, said bottom of said rotary member having at least two equally spaced threaded holes formed therein, said rotary member being disposed below said ring member such that said horizontal flange abuts said flange of said ring member and such that said side wall of said rotary member is supported by said inwardly curled lower edge of said cap member, said side wall of said rotary member and said curved side wall of said ring member cooperatively defining a first annular ball-receiving space, said horizontal flange and said side wall of said rotary member, and said inwardly curled lower edge of said cap member cooperatively defining a second annular ball-receiving space;

a plurality of steel balls rotatably confined within said first annular ball-receiving space and said second annular ball-receiving space to permit rotation of said rotary member with respect to said cap member;

an inverted U-shaped bracket having a base and two support legs suspended downwardly from said base;

at least two fastening bolts passing through said base of said inverted U-shaped bracket to engage said threaded holes of said circular bottom wall of said rotary member to permit rotation of said inverted U-shaped bracket with said rotary member; and a wheel mounted rotatably between said support legs of said inverted U-shaped bracket.

2. The caster device as claimed in claim 1, wherein a cover member is disposed between said base of said inverted U-shaped bracket and said curled lower edge of said cap member, said cover member having a bottom wall and an upwardly extending circular wall connected to said bottom wall, said fastening bolts passing through said base of said bracket and said bottom wall of said cover member to engage said threaded holes of said rotary member in order to fix said bottom wall of said cover member between said bottom of said rotary member and said bracket with said upwardly extending circular wall sleeving a lower part of said side wall of said cap member.

3. The caster device as claimed in claim 2, further comprising an inverted hat member with an annular wall surrounding an upper part of said side wall of said cap member, said annular wall of said inverted hat member having a lower edge extending adjacent to an upper edge of said upwardly extending circular wall of said cover member, said inverted hat member further having an upper edge which is formed with an outwardly extending flange, said outwardly extending flange of said inverted hat member being adapted to be fixed to the push cart.

4. The caster device as claimed in claim 1, wherein said rotary member has an opening formed in said bottom of said rotary member and an upwardly projecting lip formed along a periphery of said opening, and wherein said base of said inverted U-shaped bracket has a protrusion portion engaging said opening of said bottom of said rotary member so that said U-shaped bracket can be secured firmly to said rotary member.

5. The caster device as claimed in claim 1, wherein a mounting member has a top wall and a circular depending wall extending from said top wall of said mounting member, said top wall having a plurality of through holes formed therein, and wherein a plurality of bolts pass through said flat top of said cap member and said through holes of said mounting member in order to fix said mounting member between said cap member and the push cart with said circular depending wall sleeving an upper part of said side wall of said cap member.

6. The caster device as claimed in claim 1, wherein a plate member, which is welded on said flat top of said cap member, has a plurality of through holes formed therein and wherein a plurality of bolts pass through said flat top of said cap member and said plate member and are further adapted to pass through the push cart in order to affix said caster device to the push cart.

7. The caster device as claimed in claim 1, wherein a sliding ring is received in said inwardly curled lower edge of said cap member and supports said steel balls in said second annular ball-receiving space.

\* \* \* \* \*